(12) United States Patent
Menzel et al.

(10) Patent No.: US 7,357,380 B2
(45) Date of Patent: Apr. 15, 2008

(54) ANTI-VIBRATION ELEMENT

(75) Inventors: Johannes Menzel, Wernau (DE); Jens Helge Kutzbach, Schlaitdorf (DE)

(73) Assignee: Andreas Stihl AG & Co KG (DE)

( * ) Notice: Subject to any disclaimer, the term of this patent is extended or adjusted under 35 U.S.C. 154(b) by 0 days.

(21) Appl. No.: 10/878,208

(22) Filed: Jun. 28, 2004

(65) Prior Publication Data
US 2005/0011714 A1 Jan. 20, 2005

(30) Foreign Application Priority Data
Jul. 18, 2003 (DE) ................................ 103 32 637

(51) Int. Cl.
*F16F 1/06* (2006.01)
*F16M 1/00* (2006.01)
(52) U.S. Cl. ........................ 267/179; 267/137; 188/378; 248/638
(58) Field of Classification Search ........ 188/378–380; 267/136, 137, 286–291, 166–179; 173/162.1, 173/162.2, 210–211, 90, 201; 464/64, 68, 464/51, 61; 30/381, 383; 248/624, 638, 248/560, 636; 74/574
See application file for complete search history.

(56) References Cited

U.S. PATENT DOCUMENTS

| | | | | |
|---|---|---|---|---|
| 1,432,604 A | * | 10/1922 | Lang | 152/105 |
| 1,878,128 A | * | 9/1932 | Griswold | 267/286 |
| 2,112,293 A | * | 3/1938 | Kromm et al. | 267/249 |
| 2,520,937 A | * | 9/1950 | Kennard, Jr. | 267/169 |
| 2,704,696 A | * | 3/1955 | Rasmussen | 384/611 |
| 2,829,883 A | * | 4/1958 | Copeland | 267/287 |
| 2,875,731 A | * | 3/1959 | Settles et al. | 267/137 |
| 2,991,066 A | * | 7/1961 | Fenton | 267/287 |
| 3,014,713 A | * | 12/1961 | Fenton | 267/287 |
| 3,085,657 A | * | 4/1963 | Preis | 188/380 |
| 3,256,594 A | * | 6/1966 | Howard et al. | 29/227 |
| 3,326,545 A | * | 6/1967 | Bache | 267/287 |
| 3,559,976 A | * | 2/1971 | Jerz, Jr. | 267/290 |
| 3,572,678 A | * | 3/1971 | Jerz, Jr. | 267/225 |
| 3,622,142 A | * | 11/1971 | Lorio | 267/287 |
| 3,830,517 A | * | 8/1974 | McNeill | 280/285 |
| 3,853,202 A | * | 12/1974 | Jarboe | 182/108 |
| 3,866,896 A | * | 2/1975 | Wehner | 267/287 |
| 4,098,498 A | * | 7/1978 | Da Silva | 267/287 |
| 4,478,293 A | * | 10/1984 | Weilenmann et al. | 173/162.2 |
| 4,612,429 A | | 9/1986 | Milianowicz | |
| 4,640,500 A | * | 2/1987 | Shiau | 267/168 |
| 4,712,778 A | * | 12/1987 | Newman | 267/170 |
| 4,974,794 A | * | 12/1990 | Aubry et al. | 244/17.27 |

(Continued)

FOREIGN PATENT DOCUMENTS

DE 197 07 617 9/1997

(Continued)

*Primary Examiner*—Melody M. Burch
(74) *Attorney, Agent, or Firm*—Robert W. Becker; Robert W. Becker & Assoc

(57) ABSTRACT

In order to reduce the formation of inherent vibrations in the coil spring in an anti-vibration element, in particular for a manually operated tool such as a chainsaw, a parting-off grinder or similar device and having a coil spring, an additional mass is positioned on the coil spring.

19 Claims, 3 Drawing Sheets

U.S. PATENT DOCUMENTS

| | | | | |
|---|---|---|---|---|
| 5,090,657 A | * | 2/1992 | Dreiman | 248/624 |
| 5,361,500 A | * | 11/1994 | Naslund et al. | 30/381 |
| 5,368,107 A | * | 11/1994 | Taomo | 173/162.2 |
| 5,447,295 A | * | 9/1995 | Taomo | 267/153 |
| 6,409,160 B2 | * | 6/2002 | Meier et al. | 267/169 |
| 6,471,197 B1 | * | 10/2002 | Denk et al. | 267/175 |
| 6,763,897 B2 | * | 7/2004 | Hanke et al. | 173/210 |
| 6,799,642 B2 | * | 10/2004 | Wolf et al. | 173/162.2 |
| 2002/0104665 A1 | | 8/2002 | Wolf et al. | |
| 2003/0111311 A1 | * | 6/2003 | Saito et al. | 188/380 |
| 2004/0119216 A1 | * | 6/2004 | Menzel et al. | 267/166 |

FOREIGN PATENT DOCUMENTS

| | | | |
|---|---|---|---|
| DE | 10332637 A1 | * | 2/2005 |
| EP | 1081407 | | 3/2001 |
| GB | 2404235 | * | 1/2005 |
| JP | 53064326 | | 11/1976 |
| JP | 59-138789 | * | 8/1984 |
| JP | 2-309031 | * | 12/1990 |
| JP | 07259915 | | 10/1995 |
| JP | 10-9337 | * | 1/1998 |
| JP | 10-142253 | * | 5/1998 |
| JP | 2002-227922 | * | 8/2002 |
| WO | WO/99/56033 | | 11/1999 |
| WO | WO02/29277 | * | 4/2002 |

* cited by examiner

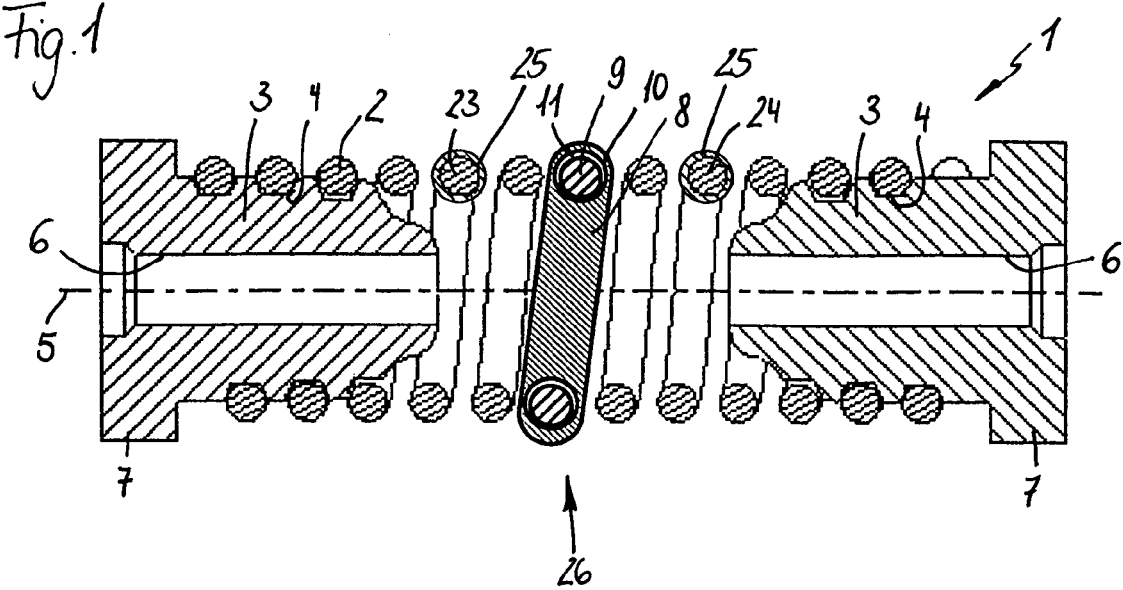
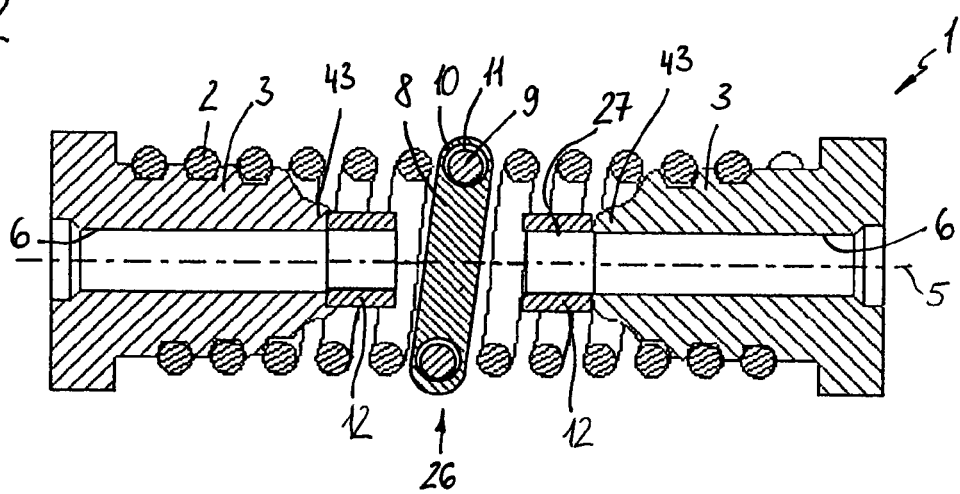
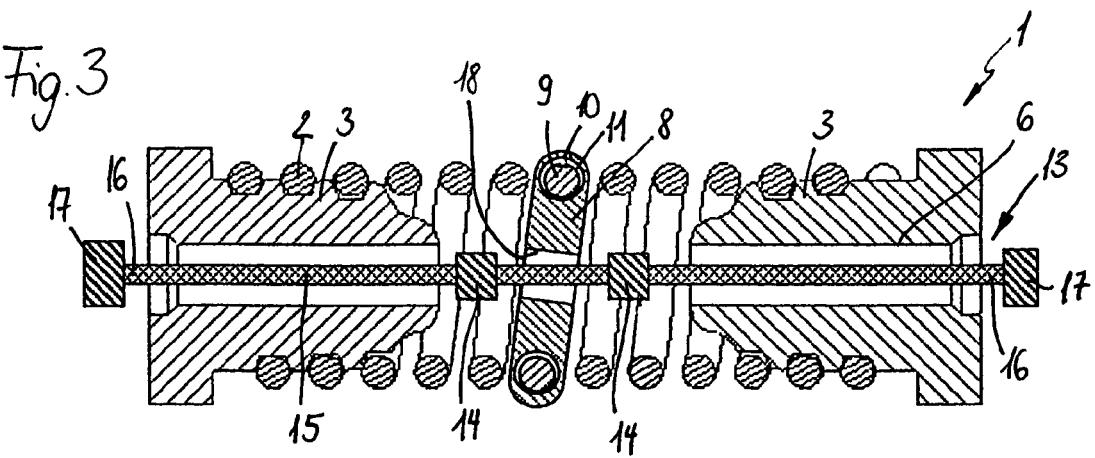

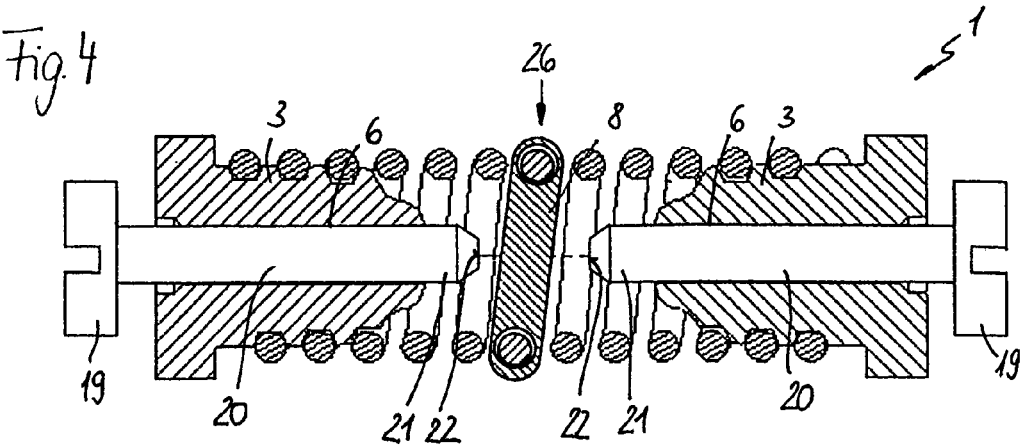
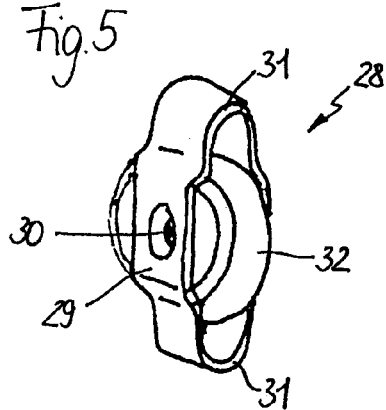
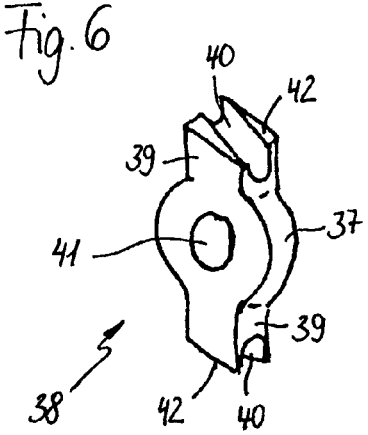
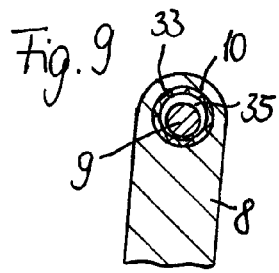
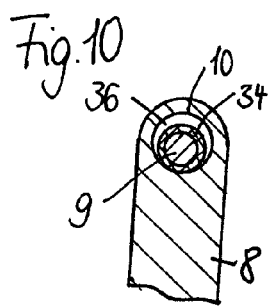
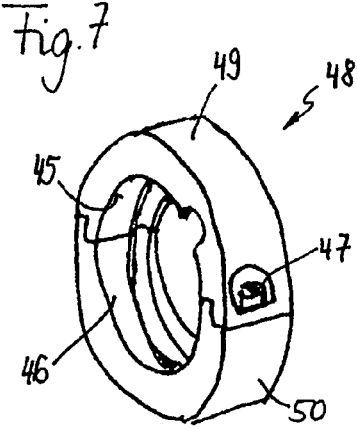
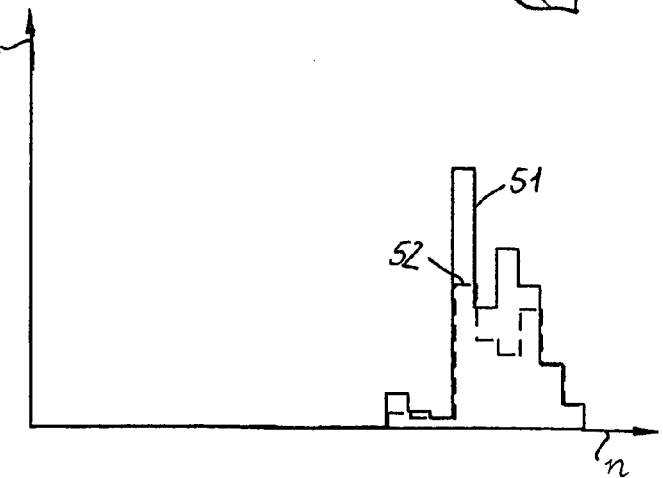

ANTI-VIBRATION ELEMENT

BACKGROUND OF THE INVENTION

The invention relates to an anti-vibration element, in particular for a manually operated tool such as a chain saw, a parting-off grinder or similar device.

An anti-vibration element with a coil spring is known from U.S. Pat. No. 5,368,107. The coil spring is fixed at both ends and connects a housing part joined to the handle system of the tool to a housing part joined to the engine of the tool. The coil spring of the anti-vibration element has no internal damping. The vibrations of the engine and the tool excite inherent vibrations in the coil spring. These form within a frequency range of 200 to 1000 Hertz depending on the geometry of the spring. These inherent vibrations are transmitted to the handle system of the tool and may, within certain frequency ranges, represent the most significant share of total vibration at the handle system. This vibration is then absorbed by the operator and thus reduces ease of operation and causes the operator to tire more quickly.

The object of the invention is to create an anti-vibration element of the aforementioned general type which achieves improved vibration damping.

SUMMARY OF THE INVENTION

This object is achieved by means of an anti-vibration element having an additional mass disposed on a coil spring.

The additional mass shifts the natural frequency of the anti-vibration element. It is thus possible to achieve improved vibration damping in the relevant ranges by simple means.

In particular, the additional mass is held onto the coil spring with play. As soon as the coil spring starts to vibrate, the coil spring comes into contact with the additional mass. The coil spring causes the additional mass to accelerate and this slows the movement of the spring wire and disturbs the resonance characteristics. In this arrangement, the play between the additional mass and the coil spring is dimensioned such that, on one hand, the coil spring and the additional mass may come into contact with one another almost immediately after the start of resonance and, on the other hand, sufficient free spring range is permitted to allow the operating loads to be absorbed undisturbed by the coil spring. The fact that the additional mass is positioned with play thus prevents the formation of inherent vibrations in the coil spring. In order to avoid the development of noise and to prevent wear between the coil spring and the additional mass, an elastic material can be positioned between the coil spring and the additional mass. The elastic material acts as an additional damper. In this arrangement, the elastic material is positioned in particular with play in relation to the coil spring and/or with play in relation to the additional mass such that the additional mass is able to prevent any inherent vibration in the coil spring. The elastic material is advantageously applied in the form of a coating.

The additional mass is held loosely onto the coils of the coil spring. Due to the movement the additional mass is able to rotate itself out of the coil spring. In order to avoid this at least one stop is provided which limits the relative movement between the additional mass and the coil spring along the longitudinal axis of the coil spring. In order to be able to fix the anti-vibration element to the tool by simple means, the coil spring is held between two guides which are positioned coaxially in relation to the longitudinal axis of the spring. A stop is advantageously fixedly connected to a guide and in particular is designed as one part with a guide. Due to the one piece design the stop does not require any additional components. The stop can be integrated into the anti-vibration element simply. The guide advantageously has a hole positioned coaxially in relation to the longitudinal axis of the spring in which is positioned a screw for fixing the anti-vibration element. A simple stop design is achieved by causing the screw to pass through the guide and form a stop at the end of the screw. In order to avoid possible damage in the event of the failure of the coil spring, the anti-vibration element has a safety device which passes through the coil spring. A simple design is produced if a stop is fixed to the safety device. It may, however, also be useful for a stopper forming a stop to be fixed to a spring coil.

In order to fix the additional mass to the coil spring the additional mass is provided with a retainer plate by means of which it is held onto the coil spring. The retainer plate advantageously has at least one loop which encompasses a spring coil. The additional mass can be fixed to the coil spring simply by means of the retainer plate. It may also, however, be useful for the additional mass to have a groove in which sits a section of the coil spring. In this arrangement, the additional mass is particularly designed as a sleeve which has a groove in its inner periphery. The sleeve can be produced simply by forming the sleeve from two molded sections which are connected, particularly screwed together. The design of the sleeve as two molded sections means that the sleeve can be placed directly onto the coil spring rather than being screwed onto the coil spring from one end. This simplifies the fitting of the anti-vibration element. It is, however, also possible for the additional mass to be designed in the form of a disk and to have at least one outwardly projecting retainer on which the groove is formed. The additional mass is thus positioned completely within the coil spring in such a manner that the amount of space required for the anti-vibration element is not increased by the additional mass.

In order to effectively avoid the formation of natural frequencies in the coil spring the additional mass is positioned in the area of the center of the coil spring. It may, however, also be advantageous for the additional mass to be positioned in the area of a vibration antinode of the coil spring.

BRIEF DESCRIPTION OF THE DRAWINGS

Embodiments of the invention are explained below with reference to the drawings, in which:

FIGS. 1-4 show longitudinal sections through anti-vibration elements with additional masses;

FIGS. 5-7 show perspective views of additional masses;

FIG. 8 shows a diagram in which the acceleration of the handle is plotted against the engine speed of a tool;

FIGS. 9/10 show sections through an additional mass on a spring coil;

DESCRIPTION OF SPECIFIC EMBODIMENTS

Figure 11:
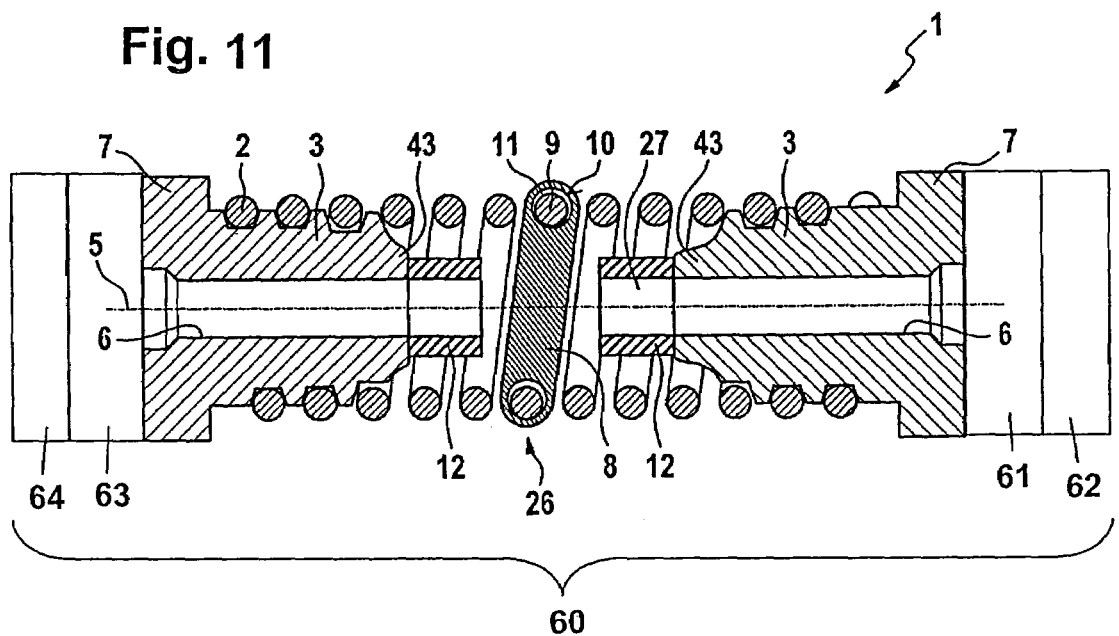
FIG. 11 schematically illustrates a tool.

The anti-vibration element 1 illustrated in section in FIG. 1 comprises a coil spring 2 which is held between two guides 3. The guides 3 are positioned concentrically in relation to the longitudinal axis 5 of the coil spring 2 and have an essentially cylindrical base body around which runs a helical groove 4. The base body projects into the inside of the coil spring 2 with the coil spring 2 lying in the groove 4. Formed at the end of each guide 3 which projects from the coil spring 2 is a stepped section 7 which lies adjacent to a component to which the anti-vibration element 1 is fixed. The anti-vibration element 1 is provided in particular for a manually operated tool 60 (FIG. 11) such as a chain saw, a parting-off grinder or similar device. In this arrangement, one guide 3 of the anti-vibration element 1 is fixedly joined to a housing part 61 which is connected to the internal combustion engine 62 of the tool, while the other guide 3 is connected to the handle housing 63 of the tool on which are positioned the handle grips 64 for the operator. The anti-vibration element therefore serves to prevent the transmission of vibrations from the internal combustion engine to the handle system. For fixing to a housing part, the guides 3 have holes 6 which run coaxially to the longitudinal axis 5 of the coil spring 2 and are designed as through holes in the embodiment illustrated.

Positioned in the area of the geometrical center 26 of the coil spring 2 is an additional or supplemental mass 8. The additional mass 8 is of essentially disk-shaped design and has two holes 10 positioned approximately opposite one another through each of which runs a coil 9 of the coil spring 2. As shown in the schematic view given in FIG. 1, the external diameter of the spring wire of the coil 9 of the coil spring 2 is smaller than the diameter of the hole 10. An area of play 11 is thus formed between the coil 9 and the hole 10. The additional mass 8 is able to move along the longitudinal axis 5 and in all directions perpendicular thereto in relation to the coil spring 2. In order to prevent the additional mass 8 from rotating out of the coil spring 2, stoppers 25 are provided on both sides of the center 26 on spring coils 23 and 24. The stoppers 25 are particularly designed as rubber rings positioned around the spring wire at the spring coils 23 and 24. These form stops which limit the path of the additional mass in relation to the coil spring 2 along the longitudinal axis 5 of the coil spring 2.

Figure 12:
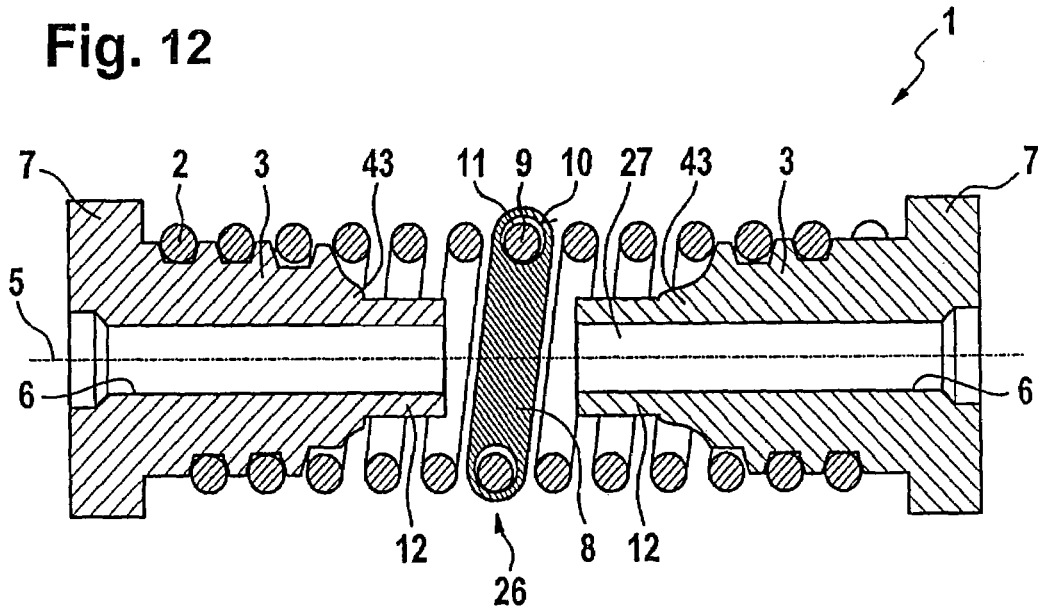
FIG. 12 is a longitudinal section through an anti-vibration element having an additional mass.

FIG. 2 shows an embodiment of an anti-vibration element 1. Components which are identical to those illustrated in FIG. 1 are designated by the same reference numerals. The anti-vibration element 1 has a coil spring 2, the two ends of which are held onto two guides 3 and in the center 26 of which is positioned an additional mass 8 with play 11 in relation to the coil spring 2. Positioned at each of the ends 43 of the guides 3 which project into the inside of the coil spring 2 is a stop 12, which can be monolithically formed with the guide 3 (see FIG. 12). The stops 12 are designed in the shape of sleeves and each have a through hole 27 which runs coaxially in relation to the longitudinal axis 5 of the spring and in extension of the holes 6 formed in the guides 3. The stops 12 limit the path of the additional mass 8 along the longitudinal axis 5 of the coil spring 2.

A further embodiment of the anti-vibration element 1 is illustrated in FIG. 3. The anti-vibration element 1 has the additional mass 8 which is held onto spring coil 2 with play. The additional mass 8 has a central hole 18. The anti-vibration element 1 comprises an anti-break or anti-separation device 13. The anti-break device 13 has a cable 15 which extends through the coil spring 2 and the holes 6 in the guides 3. At the ends 16 of the cable 15 are positioned fixings 17 which serve to fix the cable 15 to the two housing parts between which the anti-vibration element 1 is positioned. In this arrangement, the cable 15 is not tensioned when the anti-vibration element 1 is in operation such that the coil spring 2 can be moved along its longitudinal axis 5 and the function of the anti-vibration element 1 is not adversely affected by the anti-break device 13. Should the coil spring 2 break during operation, the two parts of the housing thus remain connected by the anti-break device 13. The cable 15 runs through the hole 18 in the additional mass 8. Stops 14 are positioned on the cable 15 on both sides of the additional mass 8 such that the stops 14 limit the relative movement of the additional mass 8 in relation to the coil spring 2 along the longitudinal axis 5.

In the embodiment of the anti-vibration element 1 illustrated in FIG. 4, screws 19 are positioned in the holes 6 in the guides 3. In this arrangement, the shanks 20 are longer than the holes 6 and the ends 21 of the screws 19 facing away from the screw head therefore project beyond the guides 3 towards the additional mass 8 positioned in the area of the center 26 of the coil spring 2. Formed on the ends 21 of the screws 19 are stops 22 that limit the path of the additional mass 8 in the direction of the longitudinal axis 5 of the coil spring 2.

FIG. 5 shows an embodiment of an additional mass 28. The additional mass 28 has a disk 32 which is held in a retainer plate 29. The retainer plate 29 extends at right angles over the two front faces of the disk 32, the width of the retainer plate 29 being smaller than the diameter of the disk 32. At the periphery of the disk 32 the retainer plate 29 is positioned such a distance from the disk 32 that loops 31 are formed on opposing sides of the disk 32 through which a coil of the coil spring 2 is able to project. In order to fit the additional mass 28 this must be screwed into the coil spring 2. The additional mass 28 has a central hole 30 which passes through both the retainer plate 29 and the disk 32 and through which the cable 15 of an anti-break device 13 can be fed.

FIG. 6 shows an additional mass 38 which has a disk-shaped base body 37 with a central hole 41. Projecting outwards from the base body 37 are retainers 39 which are positioned opposite one another. Provided on the outsides 42 of the retainers 39 are grooves 40 into which a section of a coil spring 2 can be introduced. When fitted to a coil spring 2 the retainer 38 must also be screwed into the coil spring.

FIG. 7 shows an additional mass 48 which has a groove 46 running around its internal periphery 45 into which a section of a coil spring 2 can be introduced. While the groove in the additional mass 48 is able to take some two coils of the coil spring 2, the additional masses 28 and 38 each sit adjacent to only a short part of a coil 9 of a coil spring 2. The additional mass 48 is made of two half shells or molded sections 49 and 50 which are connected together rigidly by means of screws 47. To fit the additional mass 48 to the coil spring 2, the two molded sections 49 and 50 can be placed on the outer periphery of the coil spring 2 in the center 26 of the coil spring 2 and screwed together by means of screws 47. The additional mass 48 does not need to be screwed in.

FIG. 8 shows by way of example the level of acceleration (a) at various engine speeds (n). A first curve 51 in the form of a continuous or solid line shows the handle acceleration (a) which occurs with an anti-vibration element with a coil spring but without an additional mass, while the broken line 52 shows the level of handle acceleration (a) which occurs in the case of a tool with an anti-vibration element 1 having an additional mass 8 held onto a coil spring 2 with play. At high speeds (n) which characterize the range of spring resonance, handle acceleration (a) is lower with an anti-vibration element with additional mass than with an anti-vibration element without an additional mass.

FIG. 9 shows a section through a spring coil 9 onto which an additional mass 8 is held. The additional mass has a hole 10 in which is positioned an elastic material 33. An area of play 35 is formed between the elastic material 33 and the coil 9 of the coil spring 2. The additional mass 8 is thus able to move freely a certain amount in relation to the spring coil 9. In the embodiment illustrated in FIG. 10, elastic material 34 is positioned on the spring coil 9 and an area of play 36 is formed between the elastic material 34 and the hole 10 in the additional mass 8. It may, however, be useful to form play both between the spring coil 9 and the elastic material and between the elastic material and the hole 10. The elastic material 35 in the hole 10 and the elastic material 34 on the spring coil 9 are advantageously applied as a coating.

The specification incorporates by reference the disclosure of German priority document 103 32 637.5 filed Jul. 18, 2003.

The present invention is, of course, in no way restricted to the specific disclosure of the specification and drawings, but also encompasses any modifications within the scope of the appended claims.

We claim:

1. A manually operated tool having an internal combustion engine and a handle system, comprising:
    an anti-vibration element operatively disposed between the internal combustion engine and the handle system to prevent transmission of vibrations from the internal combustion engine to the handle system,
    wherein said anti-vibration element includes a coil spring, and
    an additional mass disposed on said coil spring,
    wherein said entire additional mass is held on said coil spring with play,
    wherein said additional mass is freely movable relative to said coil spring by a certain amount,
    wherein said additional mass is held loosely on at least one coil of said coil spring,
    wherein said additional mass comes into contact with said coil spring during operation of said tool when said coil spring begins to vibrate, and
    wherein due to such contact with said coil spring said additional mass is accelerated by said coil spring, thereby disturbing the formation of resonance of said coil spring to prevent formation of inherent vibrations in said coil spring.

2. A tool according to claim 1, wherein an elastic material is disposed between said coil spring and said additional mass.

3. A tool according to claim 2, wherein said elastic material is disposed with play relative to said coil spring.

4. A tool according to claim 2, wherein said elastic material is disposed with play relative to said additional mass.

5. A tool according to claim 2, wherein said elastic material is applied as a coating.

6. A tool according to claim 1, wherein at least one stop is provided that limits a relative movement between said additional mass and said coil spring in a direction of a longitudinal axis of said coil spring.

7. A tool according to claim 1, wherein two guides are provided that are disposed coaxially relative to a longitudinal axis of said coil spring, and wherein said coil spring is held between said two guides.

8. A tool according to claim 7, wherein a stop is fixedly connected with one of said guides.

9. A tool according to claim 8, wherein said stop is monolithically formed with said guide.

10. A tool according to claim 7, wherein one of said guides is provided with a bore that is disposed coaxially relative to a longitudinal axis of said coil spring, wherein a screw is disposed in said bore for a securement of said anti-vibration element, wherein said screw extends through said guide, and wherein a stop is formed on an end of said screw.

11. A tool according to claim 6, wherein a safety element is provided that extends through said coil spring, and wherein said at least one stop is secured to said safety element.

12. A tool according to claim 6, wherein a stopper, which forms a stop, is secured to a coil of said coil spring.

13. A manually operated tool having an internal combustion engine and a handle system, comprising:
    an anti-vibration element operatively disposed between the internal combustion engine and the handle system to prevent transmission of vibrations from the internal combustion engine to the handle system, wherein said anti-vibration element includes a coil spring, and
    an additional mass disposed on said coil spring, wherein said entire additional mass is held on said coil spring with play, wherein said additional mass is movable relative to said coil spring, and is held loosely on coils of said coil spring, to prevent formation of inherent vibrations in said coil spring, and wherein said additional mass is provided with a retainer plate for holding said additional mass on said coil spring.

14. A tool according to claim 13, wherein said retainer plate has at least one loop that extends about a coil of said coil spring.

15. A tool according to claim 1, wherein said additional mass has a groove in which rests a portion of said coil spring.

16. A tool according to claim 15, wherein said additional mass is in the form of a sleeve, and wherein said groove is formed on an inner periphery of said sleeve.

17. A tool according to claim 16, wherein said sleeve is formed from two half shells that are interconnected, especially being screwed together.

18. A tool according to claim 15, wherein said additional mass is disk-shaped and has at least one outwardly projecting retainer on which said groove is formed.

19. A tool according to claim 1, wherein said additional mass is disposed in the region of a center of said coil spring, or is disposed in the region of a vibration antinode of said coil spring.

* * * * *